United States Patent [19]
Trumble et al.

[11] Patent Number: 6,091,814
[45] Date of Patent: Jul. 18, 2000

[54] STIFFENING ELEMENTS FOR A POLYMERIC TELEPHONE BASE

[75] Inventors: William P. Trumble; Michelle Lise Frenette, both of Kanata, Canada

[73] Assignee: Nortel Networks Corporation, Montreal, Canada

[21] Appl. No.: 09/057,528

[22] Filed: Apr. 9, 1998

[51] Int. Cl.[7] .................................................. H04M 1/00
[52] U.S. Cl. ........................................................... 379/428
[58] Field of Search .................................. 379/428, 429, 379/435, 436; 361/400, 398, 419, 420

[56] References Cited

U.S. PATENT DOCUMENTS

| | | | |
|---|---|---|---|
| 4,751,612 | 6/1988 | Smith | 361/400 |
| 5,157,724 | 10/1992 | Schmidt et al. | 379/428 |
| 5,862,214 | 1/1999 | Aggus et al. | 379/428 |

Primary Examiner—Jack Chiang
Attorney, Agent, or Firm—Angela C. de Wilton

[57] ABSTRACT

A polymeric telephone base having two housing members with one of the members provided with an integral mounting for receiving a telephone operating component. A plurality of elongate load distributing and wall stiffening elements extends in divergent manner from the mounting at spaced positions around the site for location of the operating component. This structure can result in a significantly reduced support wall thickness. It is preferable that each stiffening element tapers away from each mounting and is directed towards a location at which side walls of the support member merge into each other. At this location, reinforcing fillets extend between the side walls and the support wall. A device is also provided to flex the support wall to increase locking action between the housing members when these are assembled.

17 Claims, 5 Drawing Sheets

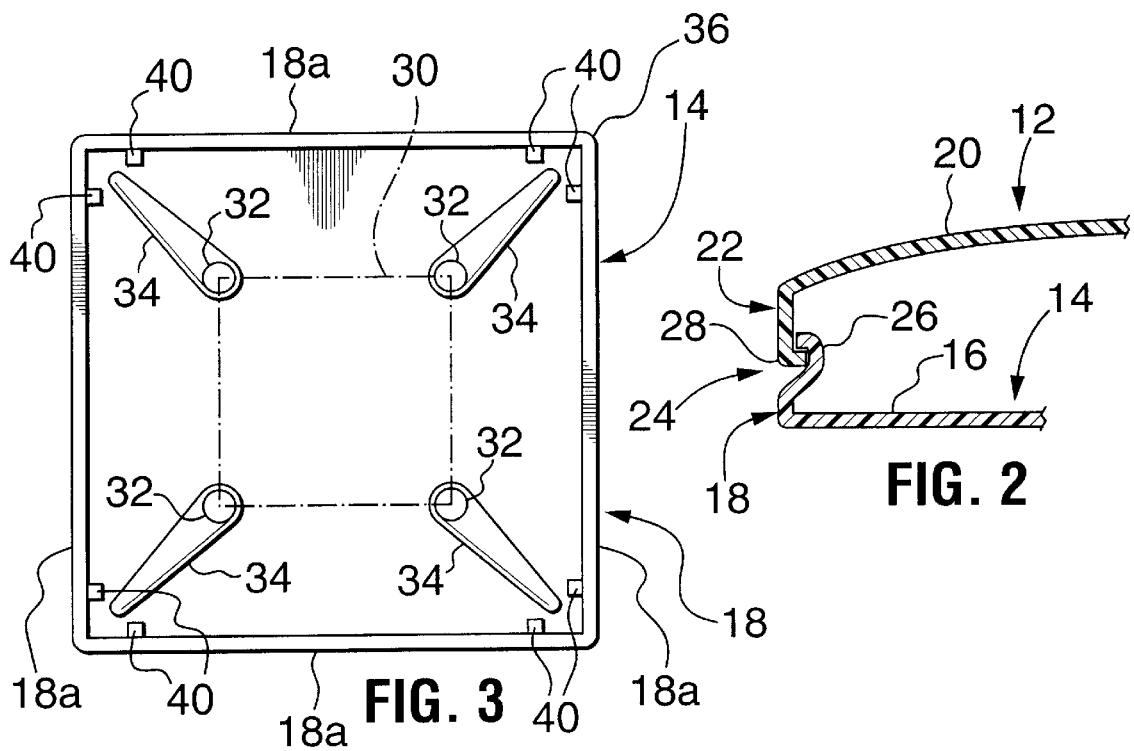
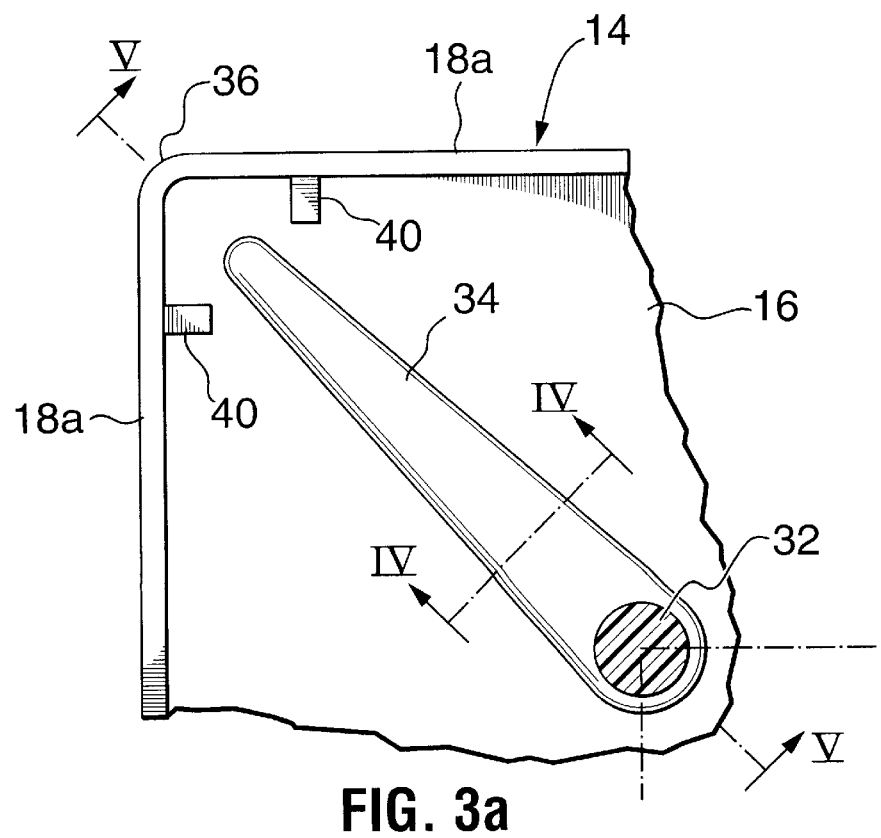

STIFFENING ELEMENTS FOR A POLYMERIC TELEPHONE BASE

FIELD OF THE INVENTION

This invention relates to telephone bases.

BACKGROUND OF THE INVENTION

In the telephone industry, it was an object in conventional practice in the past to provide substantial weight to a telephone base, because, at that time, it was believed that weight conveyed to the user that the product had technical value, was of advanced design, and was dependable in operation. For this purpose, it was not unusual to add weight, other than that required for telephone function, to a telephone base to create the illusion that the user had an article of value. Such added weight conventionally was in the form of added lead masses situated within the telephone base. However, over more recent years, and now particularly with the development of portable telephones, i.e. cellular or radio telephones, attitudes of the public have changed in that weight is considered to be an inconvenience which detracts from the appeal of a telephone. This attitude now applies to telephones generally. As a result, extra weight is no longer added to telephone bases and one of the objectives is in contrast, weight reduction accompanied in many cases with size reduction. The new designs of telephone bases include housings which have minimum weight but necessarily requiring a thickness of at least about 3 millimeters so as to require the desired robustness and strength. It has also, in more recent times, become an object in product design to save on production materials, not only from an economic standpoint but also so as to save on resources. Weight reduction in telephone bases is thus of great assistance in this respect.

BRIEF SUMMARY OF THE INVENTION

The present invention seeks to provide a telephone base construction which may have further weight and material reduction while providing necessary strength to the structure.

Accordingly, the present invention provides a polymeric telephone base comprising two connectable housing members one at least of which has a support wall having an integral mounting means extending from an inner surface of the housing for locating a telephone operating component at a site defined by the mounting means, and a plurality of elongate load distributing and wall stiffening elements for stiffening the support wall and for distributing the load of the operating components from the mounting means and into the wall, the stiffening elements extending in divergent manner away from the mounting means and away from the site in spaced apart positions around the site or extending in a radially divergent manner from the mounting means and the site.

With the telephone base of the invention, forces in the mounting means created by the weight of the components are channelled into the stiffening elements so as to be distributed along the stiffening elements into the support wall. With this structure, savings in materials may result in that wall thickness, apart from at the stiffening elements themselves, may be minimized below that previously considered possible. It is believed that the wall thickness may be reduced as low as at least 0.9 millimeters while maintaining an acceptably rigid product with a load bearing housing. The stiffening elements are not required to have substantial depth or thickness to produce the desired result. For instance, the stiffening elements need only have a depth above the support wall surface at the mounting means of less than 0.4 millimeters. For stress considerations, it is clearly advantageous to reduce the cross-sectional area of each stiffening element as it extends away from the mounting means and away from the site of the operating component. Such area reduction may be produced by tapering each stiffening element, or by a reduction in its height, or both. Ideally, each stiffening element has a convex surface which merges into the support wall surface at a base of the stiffening element. This shape is ideally suited to area reduction along the element as a height reduction of the element is automatically accompanied by tapering of the element. Preferably the height of the stiffening element decreases to 0 so that it merges fluently into the surface of the support wall.

Preferably, the housing member has side walls extending from a periphery of the support wall and each stiffening member extends towards and terminates adjacent a location at which two side walls extend into each other. At such a location, the structure including the support wall is stiffer than at other locations and is ideally suited for termination of the stiffening element. It is also advantageous to provide reinforcing fillets extending between the support and the side walls in the vicinity where the side walls extend into each other, the fillets being located to receive load distributed from the end of the stiffening elements.

In one construction, the mounting means comprises a plurality of spaced-apart mounting posts extending from the support wall. In another construction the mounting means comprises a mounting wall defining a periphery of the site and the stiffening elements extend outwards from the mounting wall.

In a particular arrangement, the housing members have snap action assembly means for assembling them together. This avoids the need for assembly screws, which are normally made from metal, and thus enables materials other than plastic to be totally avoided in the housing. If the housing members have a common polymer or are made from compatible polymers then the whole housing may be easily recycled if necessary without need to dismantle and remove non-polymeric parts. In the arrangement including a snap action assembly means, it is preferable that the support wall defines an aperture and a wall flexing member is provided for forcible insertion into the aperture so as to resiliently deform the support wall thereby increasing the locking force of the snap action between the housing members. Conveniently the snap action assembly means is provided by contacting side walls of the two housing members upon assembly and the resilient deformation of the support wall causes flexing of the side walls of that housing member outwards so as to increase the locking force of the snap action.

BRIEF DESCRIPTION OF THE DRAWINGS

One embodiment of the invention, will now be described with reference to the accompanying drawings in which:

FIG. 2 is a cross-sectional view through part of the telephone base taken along line ll—ll in FIG. 1;

FIG. 3 is a plan view of a lower housing member of the telephone base, i.e. taken along line lll—lll in FIG. 1;

FIG. 3a is a view similar to FIG. 3, but of a corner region only of the lower housing member and to a larger scale;

FIGS. 4 and 5 are cross-sectional views through the lower housing member and taken along lines lV—lV and V—V in FIG. 3a;

FIG. 6 is an isometric view of the corner of the lower housing member shown in FIG. 3a;

DETAILED DESCRIPTION OF THE INVENTION

Figure 1:
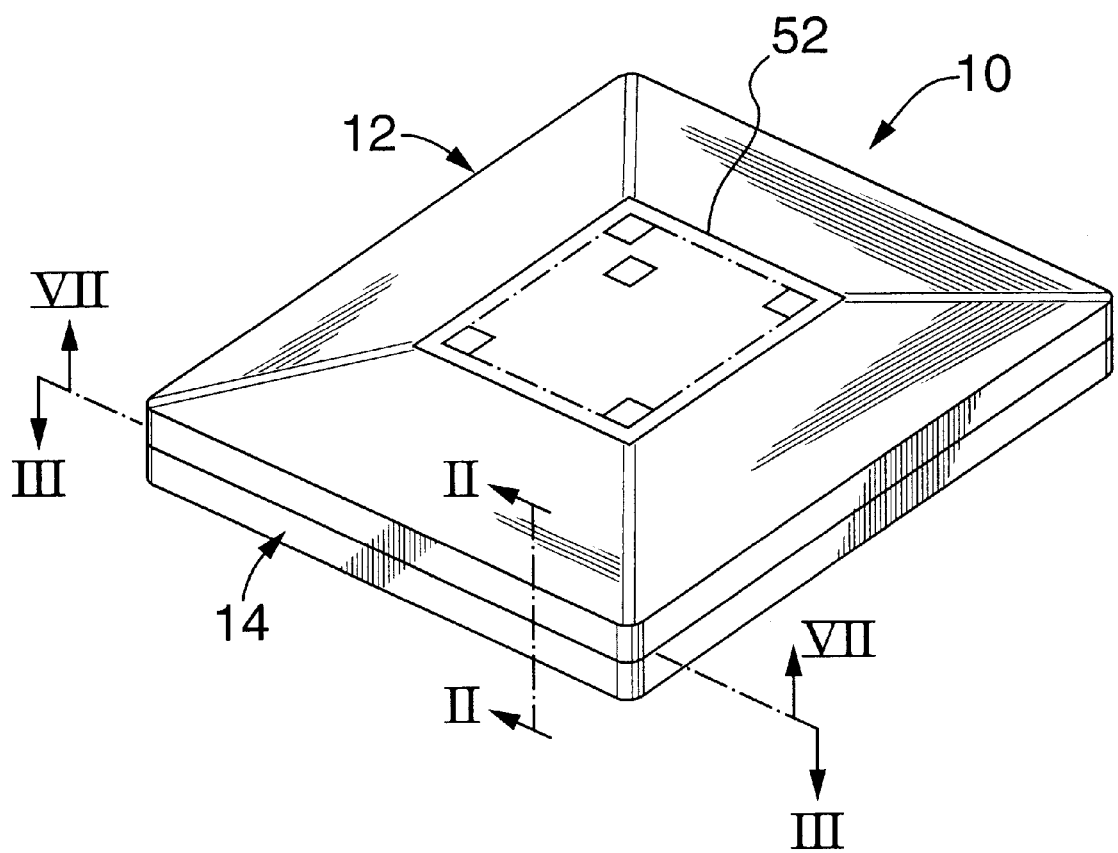
FIG. 1 is an isometric view of a telephone base according to the embodiment.

As shown in FIG. 1, a polymeric telephone base 10 of the embodiment comprises an upper housing member 12 and a lower housing member 14. The lower housing member 14 as shown in FIG. 2 has a bottom wall 16 which provides a support wall for operating components of the telephone as will be described, the support wall 16 having peripheral side walls 18 extending upwardly. The upper housing member 12 has a top wall which provides a support wall 20 for other operating components as will be described. From the wall 20 depends peripheral side walls 22. As may be seen from FIG. 2, the side walls 18 and 22 are connected together in the assembly of the telephone base by a snap action assembly means indicated generally as 24. This snap action assembly means comprises a latch 26 integrally formed at the free end of the side walls 18 and which engages behind an inwardly extending shoulder 28 of the side walls 22.

As shown by FIG. 3, the lower housing member 14 is provided with mounting means for locating a printed circuit board 30 in its desired fixed position within the telephone base. The mounting means comprises four mounting posts 32 which are disposed at the four corners of a rectangle or square (as shown) are integral with the support wall 16 and extend upwards from the support wall. In addition, the lower housing member is provided with a plurality of elongate load distributing and wall stiffening elements 34. These stiffening elements are associated one with each of the mounting posts 32 and extend outwardly in divergent manner away from the posts and away from the site for the printed circuit board shown in chaindotted in FIG. 3. Each of the stiffening elements extends towards and terminates adjacent to a location at which two substantially straight sections 18a of the side walls extend into each other. In the construction of the embodiment this location is at a virtual junction point of the side wall lengths, with a small blend radius 36 extending between them.

Figure 4:
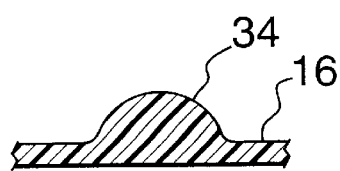
Figure 5:
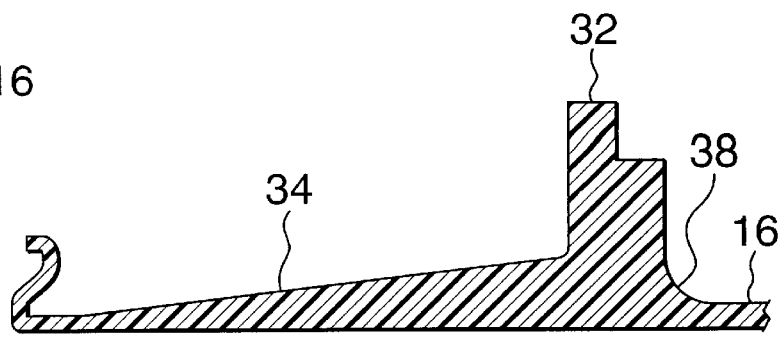
Figure 6:
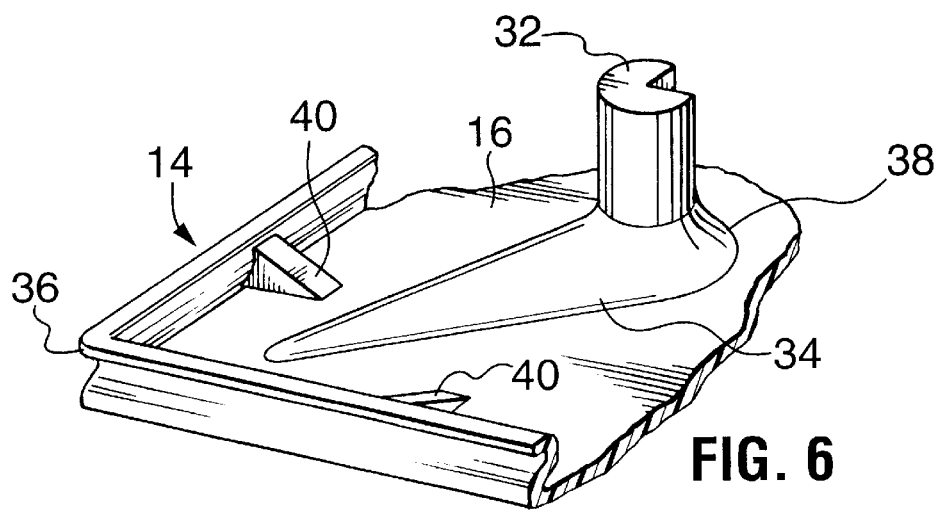

As shown by FIG. 4, each of the stiffening elements 34 has a convex upper surface which merges with the upper surface of the support wall 16. Also as shown by FIGS. 5 and 6, each of the mounting posts 32 has a slightly tapered but otherwise cylindrical surface which blends with the upper surface of the support wall 16 with a small blend radius 38 which may be of the order of between 0.3 and 0.35 millimeters as required. The end of the associated stiffening element 34 also blends into the post 32 and into the blend radius 38 and has a height at the post end substantially that at which the blend radius 38 merges with the post.

As may be seen from FIGS. 4, 5 and 6, each of the stiffening elements 34 reduces in height as it extends away from its mounting post 32 whereby its cross-sectional area reduces accompanied by a tapering of the element.

The outer end of each stiffening element is directed towards the location at which two side wall lengths extend into each other, i.e. at junction 36, and because of the relative disposition of the side wall lengths at that location, the structure of the mounting member 14 is particularly stiff. The mounting members distribute load into the support wall 16 along their lengths with any residual load being directed into the stiff wall region at the junction 36 of the side wall lengths 18a. To assist in adding to this stiffness small reinforcing fillets 40 project from the side wall lengths 18a and from the support wall 16 at the junction of the support wall to the side wall lengths. A fillet 40 is located at each side of each junction 36.

In use of the telephone base, load is imparted into each mounting post 32 by the printed circuit board 30 with this located in place, and this load is taken into each of the stiffening elements 34 and is distributed along the lengths of the stiffening elements and out into the support wall 16. The design is such that excessive stress points are avoided and the structure around the locations 36, and including the fillets 40, help in this regard. Because the loading is distributed in the manner described by the stiffening elements 34, it is found that the support wall 16 may be exceptionally thin and may be of the order of down to 0.9 millimeters, particularly when made of sufficiently strong material, such as polycarbonate materials. This exceptionally thin wall construction is achieved even though each of the stiffening elements is not itself particularly large in cross-sectional area as is clear from the measurements for each stiffening element given above.

As may be seen therefore from the above construction described, the material used for the lower housing member is minimized.

Reduction in materials used for the telephone base is assisted by the construction of the upper housing member as will now be described.

Figure 7:
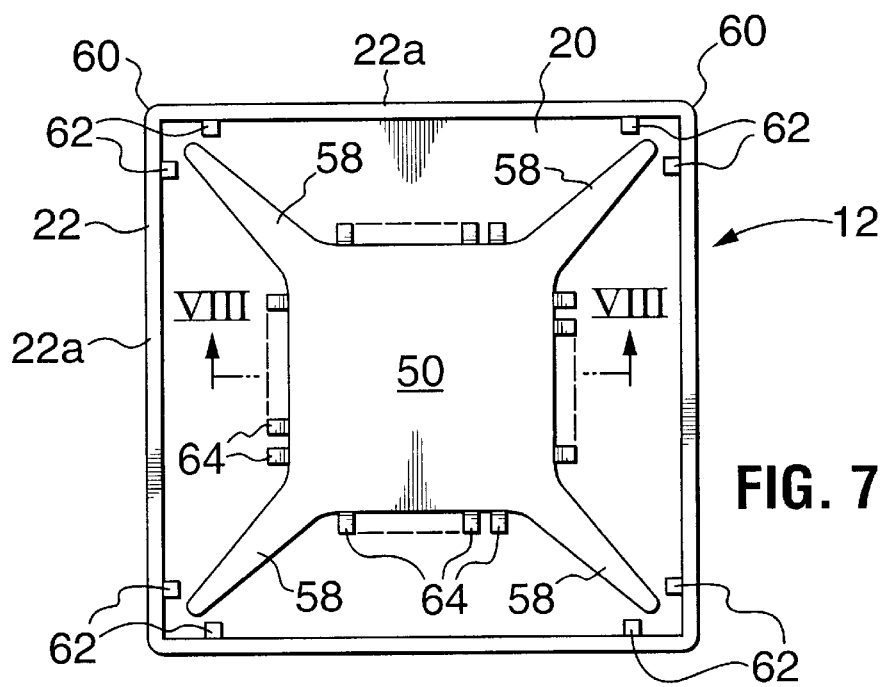
FIG. 7 is an underside plan view of an upper housing member of the telephone base, i.e. taken line Vll—Vll in FIG. 1.
Figure 8:
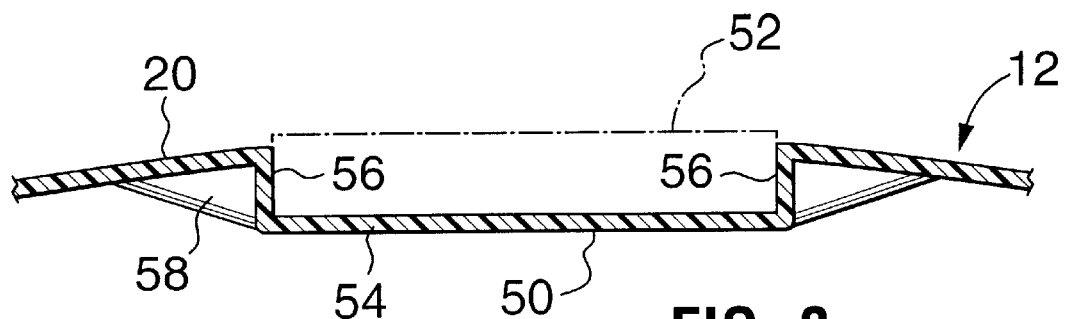
FIG. 8 is a cross-sectional view through the upper housing member and taken along line Vlll—Vlll in FIG. 7 to larger scale.
Figure 9:
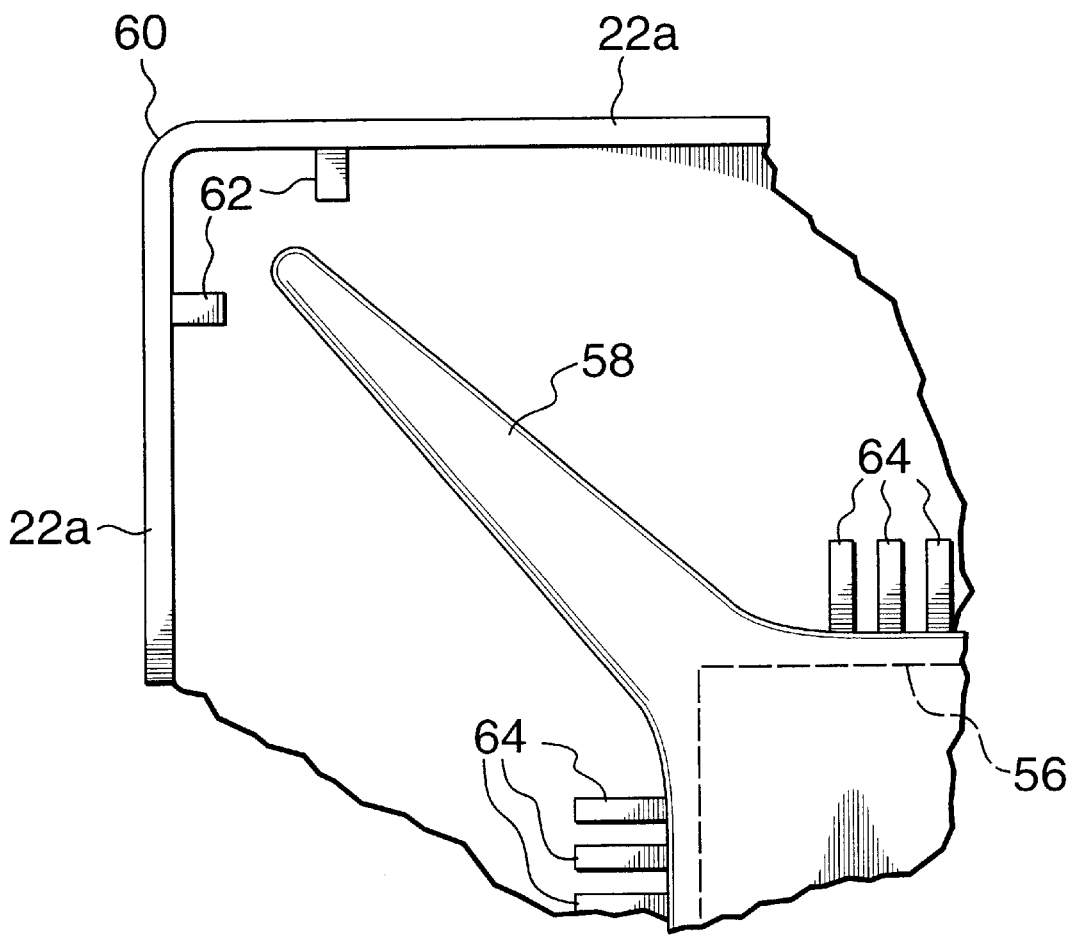
FIG. 9 is a view similar to FIG. 7 of part of the upper housing member and to larger scale.

As shown in FIGS. 7, 8 and 9, the upper housing member 12 is formed in the support wall 20 with a well 50 (see particularly FIG. 8) which is of square plan as shown by FIG. 7. The well 50 is to receive by frictional engagement, a dial pad 52 shown in chaindotted outline in FIG. 8 and in full outline in FIG. 1. As shown by FIG. 8 the well 50 has a bottom wall 54 and side walls 56 joining the bottom wall to the remainder of the support wall 20. The upper housing member is provided with four stiffening elements 58 which extend in spaced-apart positions away from the well 56, i.e. away from each corner of the well. Each stiffening member extends also towards a location 60, i.e. at the junction of two side wall lengths 22a of the side wall 20. Fillets 62 are of similar construction to the fillets 40 as described for the lower housing member and are positioned similarly to the fillets 40 with regard to the location 60. Each of the stiffening elements 58 is of similar construction to the stiffening elements 34 with comparable shapes and sizes to those shown in FIGS. 4, 5 and 6. However at their inner ends, the stiffening elements 58 blend into the wall 56 as shown in FIG. 9.

The stiffening members 58 operate in a similar fashion to the stiffening members 34 in distributing the load carried by the well 50 when the dial pad 52 is located in position, this load being distributed throughout the support wall 20 and into the side wall 22, particularly at the stiffened region around the location 60.

In addition, the wall 56 is provided with a plurality of spaced-apart fillets 64 which, as shown in FIGS. 8 and 9, extend between the stiffening elements 58 and are integral also with the support wall 20.

It follows that with use of the stiffening elements 58 and in their manner of usage, the support wall 20 may also be minimized in thickness. This thickness may be about 0.9 millimeters, i.e. similar to that of the support wall 16.

Hence the use of the stiffening elements in both of the housing elements provides a structure which minimizes the amount of polymeric material required for its construction.

Figure 10:
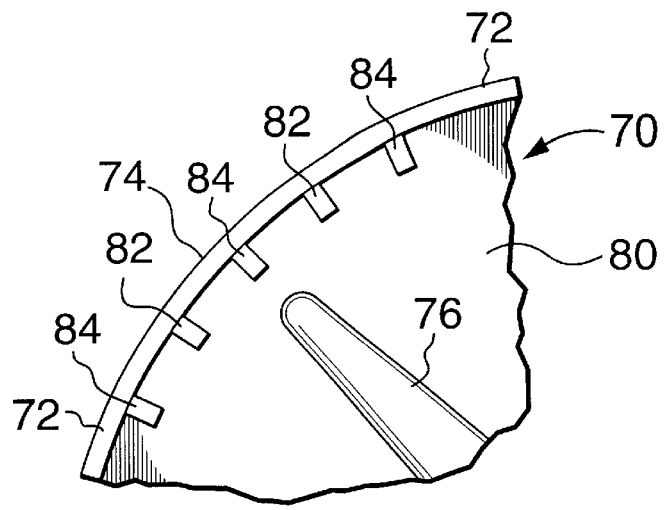
FIG. 10 is a view similar to FIG. 3 of a modification of the embodiment.

It is not necessary for the side wall lengths of the housing members to interconnect at corners or slightly rounded corners as described above. For instance, as shown in a modification of the first embodiment in FIG. 10, a housing member 70 may have side wall lengths 72 merging into one another along a large curved wall section 74 with a significantly large radius. In this construction a stiffening element 76 tapers towards the curved wall section 74 from a mounting means (not shown). With this arrangement at least one fillet 82 is integrally formed with each side wall length 72 and the support wall 80 of the housing member 70, i.e. one on each side of the longitudinal direction of the stiffening element 76. Further fillets 84 may be positioned as desired between the side wall lengths 72 and the support surface 80 or between the curved wall section 74 and the support surface 80.

Figure 11:
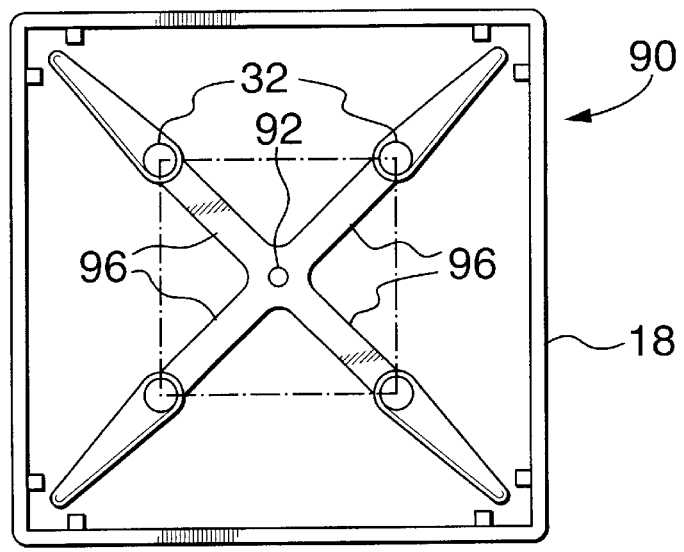
FIG. 11 is a view similar to FIG. 9 of another modification to the embodiment.
Figure 12:
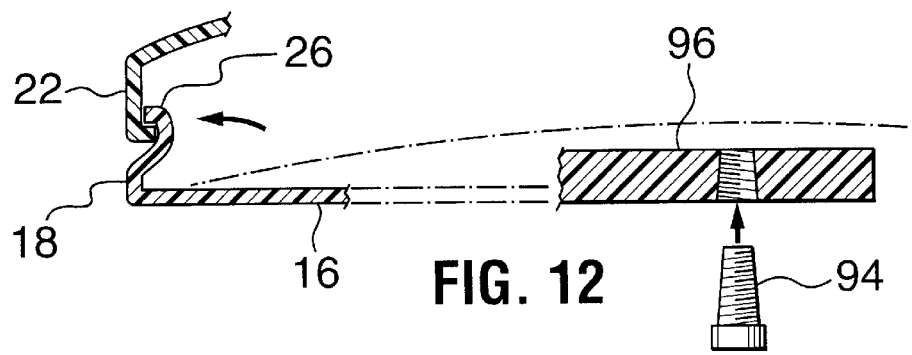
FIG. 12 is a cross-sectional view through part of the telephone base according to yet a further modification of the embodiment.

In FIGS. 11 and 12 is shown a further modification of the embodiment in which a lower housing member 90 is basically of the same structure as the lower housing member 14 and has features bearing the same reference numerals as in the first embodiment. In addition however, the support wall 16 defines a central aperture 92 which is tapered inwardly into the housing as shown by FIG. 12. A wall flexing member is provided for forcible insertion into the aperture. This wall flexing member is in the form of a plastic screw 94 which may be forcibly inserted by screwthread action into the aperture 92. As the screw 94 is screwed inwardly into the aperture, its configuration is such as to apply a force against the tapered aperture surface thereby resiliently deforming the support wall 16 inwardly in the direction of the chaindotted line shown in FIG. 12. This deformation acts upon low strengthening ribs 96 extending from the aperture 92 towards each of the mounting posts 32. As a result, the support wall 16 deforms inwardly as described above both along the ribs 96 and between the ribs, this deformation continuing through to the side wall 18. With the two housing members assembled together as shown in FIG. 12 the deformation of the support wall 16 causes the side wall 18 to be turned outwardly about its base, i.e. anticlockwise as shown in FIG. 12 in the direction of the arrow in the figure. This forces the latch structure 26 firmly against the wall 22 of the upper housing member thereby increasing the locking force of the snap action between the housing members.

What is claimed is:

1. A polymeric telephone base comprising two connectible housing members one at least of which has a support wall having an integral mounting means extending from an inner surface of the housing member for securably receiving a telephone operating component at a site defined by the mounting means, and a plurality of elongate load distributing and wall stiffening elements for stiffening the wall and distributing the load of the operating component from the mounting means and into the wall, the stiffening elements extending in a radially divergent manner from the mounting means and the site.

2. A telephone base according to claim 1 wherein each stiffening element decreases in height as it extends away from the site.

3. A telephone base according to claim 1 wherein each stiffening element tapers as it extends away from the site.

4. A telephone base according to claim 1 wherein each stiffening element has a convex surface which merges at a base of the element with the wall surface, the stiffening element decreasing in height and tapering as it extends away from the site.

5. A telephone base according to claim 1 wherein the one housing member has side wall means extending from a periphery of the support wall and each stiffening element extends towards the sidewall means and at least one reinforcing fillet is provided in relation to each stiffening element, the reinforcing fillet extending between the support wall and the side wall means to receive load imparted into the support wall from the stiffening element.

6. A telephone base according to claim 5 wherein the side wall means comprises a plurality of side wall lengths extending in series around the periphery of the support wall and each stiffening element extends towards a location at which two side wall lengths extend into one another.

7. A telephone base according to claim 6 wherein two fillets are provided in relation to each stiffening element, the fillets being located one at each side of the longitudinal direction of the stiffening element.

8. A telephone base according to claim 1 wherein the mounting means comprises a plurality of mounting posts extending from the support, and a stiffening element extends from each post.

9. A telephone base according to claim 8 wherein each post is widened at its base by a radiused surface which blends the post into the inner surface of the support wall and the stiffening element blends into the base of the post and has a height at the post substantially equal to the height at which the radiused surface merges with the post.

10. A telephone base according to claim 1 wherein the mounting means comprises a mounting wall defining a periphery of the site, and the stiffening elements extend outwards from the mounting wall.

11. A telephone base according to claim 10 wherein the mounting wall has straight sections which are interconnected at junction positions and the stiffening elements extend outwards from the junction positions.

12. A telephone base according to claim 11 having reinforcing fillets extending between the straight sections of the mounting wall and the support wall.

13. A telephone base according to claim 1 wherein the housing members have snap action assembly means for assembling them together.

14. A telephone base according to claim 13 wherein the support wall defines an aperture and a wall flexing member is provided for forcible insertion into the aperture to resiliently deform the support wall thereby increasing a locking force of the snap action between the housing members.

15. A telephone base according to claim 14 wherein the one housing member has side wall means defining the snap action means of the support member, and resilient deformation of the support wall flexes the side wall means outwardly to increase the locking force of the snap action.

16. A polymeric telephone base comprising two cooperably connectible housing members, at least one of which housing members has a support wall; a side wall peripheral to the support wall with assembly means for lockably engaging the other housing member; an aperture defined within the support wall; a plurality of elongate load distributing and wall stiffening elements for stiffening the wall and distributing deformation forces to the periphery of the support wall, the stiffening elements disposed in a radially divergent manner from the aperture; a wall flexing member for forcible insertion into the aperture to resiliently deform the support wall; and said resilient deformation of the support wall flexes the side wall to increase the locking force between housing members.

17. A telephone base according to claim 16 wherein the wall flexing member consists of a screw inserted into the aperture.

* * * * *